J. A. FILSINGER.
LUBRICATING SYSTEM FOR GEARING.
APPLICATION FILED NOV. 29, 1909.
1,004,762.
Patented Oct. 3, 1911.
3 SHEETS—SHEET 2.
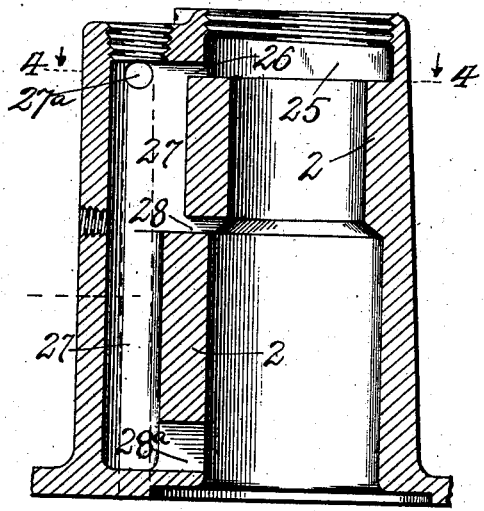
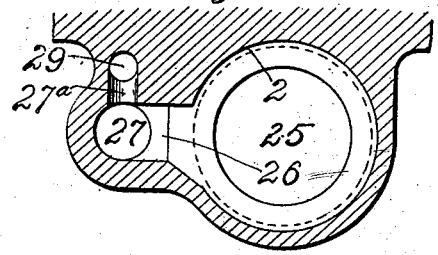
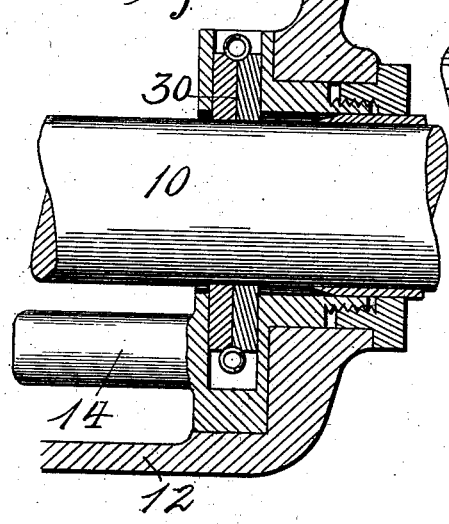
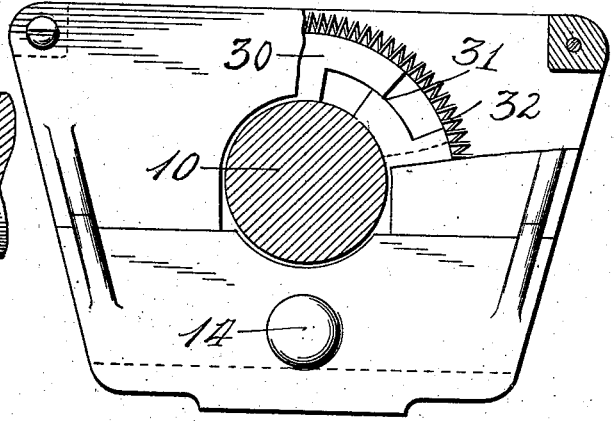
Witnesses
G. M. Copenhaver,
C. B. Melton.
Inventor,
John A. Filsinger,
By Knight Bros.
Attorneys.

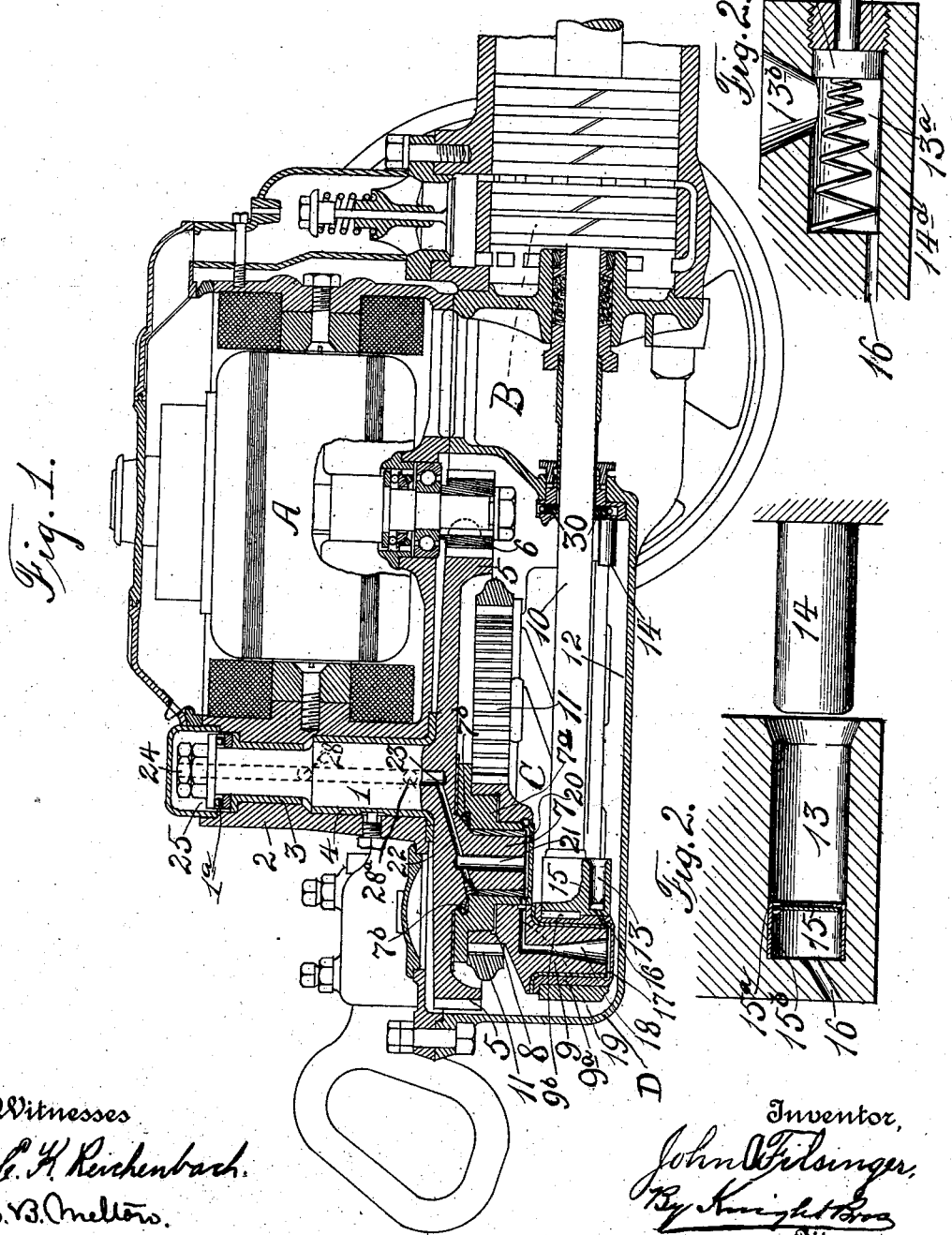

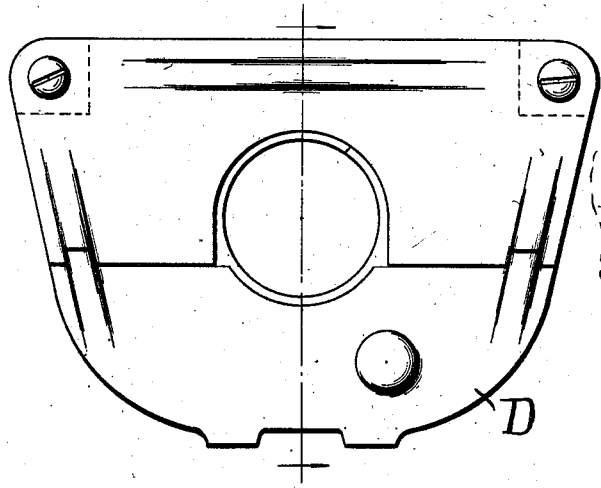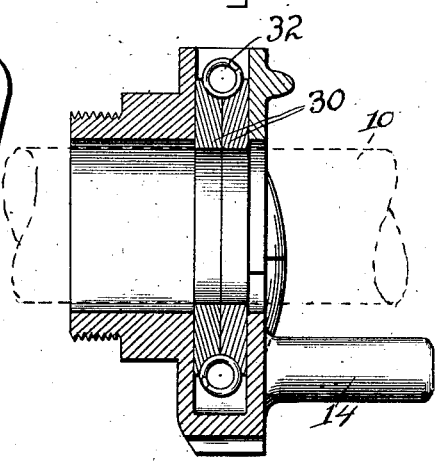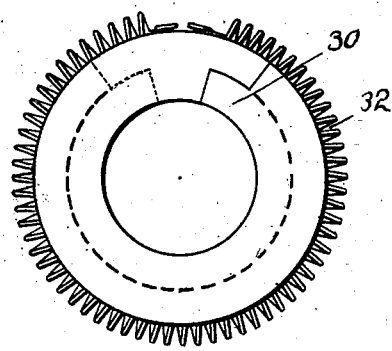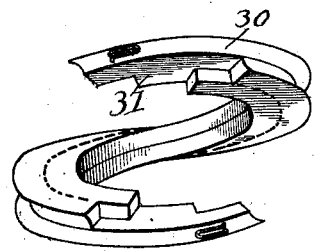

UNITED STATES PATENT OFFICE.

JOHN A. FILSINGER, OF SYRACUSE, NEW YORK, ASSIGNOR TO THE PNEUMELECTRIC MACHINE COMPANY, OF SYRACUSE, NEW YORK, A CORPORATION OF NEW YORK.

LUBRICATING SYSTEM FOR GEARING.

1,004,762.      Specification of Letters Patent.      Patented Oct. 3, 1911.

Application filed November 29, 1909. Serial No. 530,511.

*To all whom it may concern:*

Be it known that I, JOHN A. FILSINGER, a citizen of the United States, and resident of Syracuse, in the county of Onondaga and State of New York, have invented certain new and useful Improvements in Lubricating Systems for Gearing, of which the following is a specification.

My invention relates to the construction of gearing, whereby oil or other suitable lubricant is caused to reach the various bearings of the different parts of the gearing during the operation of the apparatus and it consists primarily in providing a train of gears with a series of connected ducts or passages extending successively through the gears and embodying as a part of a conduit or passageway, suitable distributing chambers adjacent to the respective bearings to be lubricated in such relation as to maintain a supply of oil thereto.

The invention further consists in arranging the passageway for the oil in the form of a circulatory system, whereby a supply of oil much larger than that needed for lubrication is constantly flowing through the system so that all parts receive an ample supply.

A further feature consists in adapting the system to a gearing designed for the purpose of developing a reciprocatory motion from a rotary motion and utilizing the movement of a reciprocating part to develop pumping pressure to force the circulation of the lubricant.

For purposes of illustration, one embodiment of my invention is shown in the accompanying drawings as applied to the driving gearing of a percussion tool of known construction.

In said drawings, Figure 1 is a vertical axial section through an electropneumatic percussion tool having a driving gear for translating rotary motion of an electric motor into reciprocating motion for a compressing piston, Fig. 2 is a sectional detail view on an enlarged scale, of the pumping means employed in Fig. 1, Fig. 2ª is a view similar to Fig. 2 showing a modified form of pumping means, Fig. 3 is a vertical section on an enlarged scale of the spindle bearing of the main gear, Fig. 4 is a horizontal section on the line 4—4 of Fig. 3, Fig. 5 is an axial section of the oil dam or packing surrounding the rod of the reciprocating piston, Fig. 6 is an inside end view of the mounting for the packing shown in Fig. 5, part of the wall of the mounting being broken away, and, Fig. 7 is an end elevation of the crank casing, Fig. 8 is a detailed sectional view of the piston rod packing, Fig. 9 is a side elevation of the packing ring, and Fig. 10 is a perspective view thereof.

A represents an electric motor, B a piston to be reciprocated thereby and C a gearing employed for the purpose of converting the rotary motion of the motor into a reciprocating motion in the piston, and D the gearing casing. The gearing comprises a supporting spindle 1 mounted in bearing 2 with interposed bushings 3, 4, and externally toothed gear 5 supported by said spindle in position to mesh with the pinion 6 of the electric motor, a crank pin 7 carried by the gear 5, the centering pinion 8 mounted on the crank 7 through the medium of interposed bushing 7ª, and the eccentric wrist 9 carried by the pinion 8, receiving the piston rod 10, the pinion 8 meshing with a fixed circular rack 11 so as to maintain the wrist 9 at all times in the line of reciprocation of the piston rod 10. This mechanism so far as described, as well as other features illustrated and not particularly referred to require no further description here.

12 represents a trough which is kept supplied with oil up to at least the level of a pump cylinder 13 carried by the head of the piston rod in position to receive the fixed piston 14 that enters said cylinder each time the piston rod nears its forward limit; the oil being thereby forced past a check valve 15, which is hinged at 15ª to a ring 15ᵇ that provides a chamber, from this chamber the oil passes through a duct 16 to a distributing base chamber 17 in the bushing 9ª of the eccentric wrist 9. From the chamber 17, the oil rises through the passage 18 to the plane of the crank pin 7 where it turns laterally through a duct 19, discharging into the base chamber 20 of the bushing 7ª that surrounds the crank pin 7. The chambers 17 and 20 extend laterally a sufficient distance to communicate with the bearing surfaces of the members to be lubricated. The duct leading into the chamber 17 comprises a single bore inasmuch as bushing 9ª is fixed against relative rotation by the key 9ᵇ. But the walls of the bushing 7ª, which provide the distributing chamber 20 are preferably bored at a number of places and surrounded by an annular channel so that oil will gain access to the chamber 20 whatever the angular position of the bushing may be.

From the chamber 20, the oil rises through the axial duct 21 and passes thence through an inclined duct 22 to the up-take 23 in the spindle 1. It escapes through the top of the spindle 1 at 24 and flowing over the securing nut into the chamber 25, not only submerges the ball bearing 1ᵃ, which supports the spindle, but overflows through a lateral passage 26 (Figs. 3 and 4) into a stand-pipe 27 whence it escapes partly through the ducts 28, 28ᵃ to the bearing of the spindle, while the surplus overflows through the passage 27ᵃ and reaches a vertical down-take 29 by which it is returned to the gearing casing at a point where it drops upon the circular rack 11 and upon the bushing surrounding the crank pin 7 so as to thoroughly lubricate those parts while returning to the trough.

From the foregoing description, it will be seen that there is a constant head or pressure of oil in the circulating system, which forces oil from the distributing chambers 17 and 20 and the ducts 28, 28ᵃ into the bearings to be lubricated. A further factor favoring the flow of oil to the bearings of the crank pin 7, is the centrifugal force of the oil contained within the pin and its distributing chamber. In order to prevent excessive flow of oil at this point, felt packings 7ᵇ are provided between the upper end of the bushing 7ᵃ and the base of the crank pin.

According to modification shown in Fig. 2ᵃ, the piston 14ᵃ remains within the cylinder 13ᵃ, which is fed through the port 13ᵇ; the piston being moved in one direction by the impingement of its rod 14ᵇ against the fixed stop 14ᶜ (preferably faced with leather or equivalent material) and in the other direction by the spring 14ᵈ against the plug 13ᶜ. When the piston is forced inward, the oil trapped in the cylinder after the piston passes the port 13ᵇ, escapes through the passage 16 as before explained.

Difficulty has been experienced in confining the oil in the trough 12 in an apparatus of the kind described owing to the reciprocation of the piston 10 through the end wall, which carries the oil into the compressing chamber. To avoid this, another feature of my invention consists in providing the wiping packing or oil dam 30, preferably constructed of a leather ring divided radially and also in the plane transverse to its axis so as to provide a double miter joint 31, which leaves no opening for the passage of oil; the split ring thus produced being held with constant pressure upon the piston rod 10 by a surrounding spring 32. A packing constructed as thus described wipes the oil from the piston rod during its forward stroke and not only prevents the waste of the oil but avoids its presence in the compression chamber.

Having thus described my invention, what I claim as new therein and desire to secure by Letters Patent is:—

1. The combination with a gearing including a rotary member, a reciprocating member and means converting rotary motion into reciprocatory motion, said rotating and reciprocating members having communicating oil passageways therein; of a gearing casing providing an oil reservoir in which the reciprocating member moves, a pump cylinder carried by said reciprocating member and having communication with the oil passageway therein and a pump piston carried by the oil reservoir, in the path of the cylinder carried by the reciprocating member and coöperating therewith to force oil through the passageways.

2. In a lubricating system of the character described, the combination of a vertical spindle, a crank pin carried by said spindle, an eccentric wrist mounted on said crank pin, a circular rack coöperating with the eccentric wrist to cause it to travel in a straight path, an oil duct extending through the eccentric wrist to the crank pin and through the crank pin to the vertical spindle, a member reciprocated by the eccentric wrist, and a pump, one member of which is carried by the reciprocating member and caused to coöperate with the other pump member by the movement of the reciprocating member.

3. In a lubricating system of the character described, the combination of a vertical spindle, a gear carried by said spindle, a crank pin carried by said gear, and an eccentric wrist mounted on said crank pin and an oil duct extending through the eccentric wrist to the crank pin, and through the crank pin and its gear to the vertical spindle, and means for supplying oil at the bottom of said duct, comprising a pump operated by the reciprocating movement of the eccentric wrist.

4. In a lubricating system, the combination of the vertical spindle having a central bore open at top, the gear carried by said spindle constructed with a crank pin, said crank pin and gear having a duct communicating with the bore of the spindle, the bushing surrounding the crank pin constructed with a distributing chamber communicating with the duct in the crank pin and also with the bearing between the crank pin and the bushing, a gear mounted on the crank pin through the medium of said bushing, carrying an eccentric wrist, a bushing surrounding the eccentric wrist constructed with a distributing chamber communicating with the bore in said wrist and also with its bearing in the bushing, and a pump cylinder disposed laterally to the eccentric wrist and communicating with the distributing chamber in the bushing of said wrist.

5. In a lubricating system, the combination of the gears, the ducts formed therein providing a passage for oil therefrom, said passage terminating in a discharge opening at the top of the uppermost gear, a stand-pipe receiving oil overflowing through said discharge opening and having ducts through which it supplies oil to one of the bearings, and a return passage communicating with the top of the stand-pipe.

The foregoing specification signed at Syracuse, New York, this 20th day of November, 1909.

JOHN A. FILSINGER.

In presence of two witnesses:
JOHN L. WAGNER,
MARY E. DOOLEY.

Copies of this patent may be obtained for five cents each, by addressing the "Commissioner of Patents, Washington, D. C."